US009002731B2

(12) United States Patent
Baiz Matuk

(10) Patent No.: US 9,002,731 B2
(45) Date of Patent: Apr. 7, 2015

(54) SYSTEM AND METHOD FOR INDIVIDUAL SEQUENTIAL CAMPAIGN

(75) Inventor: Enrique A. Baiz Matuk, Sunny Isles Beach, FL (US)

(73) Assignee: Papatel, Inc., Sunny Isles Beach, FL (US)

(*) Notice: Subject to any disclaimer, the term of this patent is extended or adjusted under 35 U.S.C. 154(b) by 82 days.

(21) Appl. No.: 13/393,907

(22) PCT Filed: Sep. 2, 2010

(86) PCT No.: PCT/US2010/047673
§ 371 (c)(1),
(2), (4) Date: May 14, 2012

(87) PCT Pub. No.: WO2011/028902
PCT Pub. Date: Mar. 10, 2011

(65) Prior Publication Data
US 2012/0221416 A1    Aug. 30, 2012

Related U.S. Application Data

(60) Provisional application No. 61/239,589, filed on Sep. 3, 2009.

(51) Int. Cl.
*G06Q 30/00*   (2012.01)
*H04M 3/08*   (2006.01)
*G06Q 30/02*   (2012.01)
*H04M 3/24*   (2006.01)

(52) U.S. Cl.
CPC ............ *G06Q 30/02* (2013.01); *G06Q 30/0264* (2013.01); *G06Q 30/0251* (2013.01); *H04M 3/248* (2013.01)

(58) Field of Classification Search
USPC ....................................... 705/14.61
See application file for complete search history.

(56) References Cited

U.S. PATENT DOCUMENTS 3,784,721 A    1/1974  Kilby
4,130,801 A   12/1978  Prygoff
4,321,665 A *  3/1982  Shen et al. ............. 710/66
(Continued)

OTHER PUBLICATIONS

PCT International Preliminary Report and Written Opinion for PCT/US2010/047673 mailed Oct. 18, 2010; 6 pages.
(Continued)

*Primary Examiner* — John G Weiss
*Assistant Examiner* — Scott C. Anderson
(74) *Attorney, Agent, or Firm* — Hunton & Williams LLP

(57) ABSTRACT

Exemplary embodiments of the invention include the use of a guaranteed cognitive awareness coupled with an individualized sequential advertising campaign directed at a specific user. A user may be offered services such as: telecommunication services, video services, radio or other audio services (traditional radio or satellite radio services), television services (traditional cable or satellite television services), software services, electronic book services, etc. In return for the use of such services free of charge, the services may be periodically interrupted and a commercial message may be conveyed to the user. The commercial message may prompt the user to input a specific value, selection, or keystroke, or may require a response through voice input or selection with a device. Should the user provide the response, the provision of services may continue. Moreover, the commercial messages provided to the user may presented as an individual sequential advertising campaign.

14 Claims, 4 Drawing Sheets

(56) References Cited

U.S. PATENT DOCUMENTS

| | | | |
|---|---|---|---|
| 5,396,542 A | 3/1995 | Alger et al. | |
| 5,481,611 A | 1/1996 | Owens et al. | |
| 5,845,205 A | 12/1998 | Alanara et al. | |
| 5,883,964 A | 3/1999 | Alleman | |
| 6,009,150 A | 12/1999 | Kamel | |
| 6,301,342 B1 | 10/2001 | Ander et al. | |
| 6,496,857 B1* | 12/2002 | Dustin et al. | 709/219 |
| 6,590,970 B1 | 7/2003 | Cai et al. | |
| 6,614,896 B1 | 9/2003 | Rao | |
| 6,683,941 B2 | 1/2004 | Brown et al. | |
| 6,856,673 B1 | 2/2005 | Banks et al. | |
| 6,889,054 B2 | 5/2005 | Himmel et al. | |
| 6,947,531 B1 | 9/2005 | Lewis et al. | |
| 6,993,497 B2* | 1/2006 | Yeh et al. | 705/14.66 |
| 7,440,563 B2 | 10/2008 | Baiz Matuk | |
| 2001/0012344 A1 | 8/2001 | Kwon | |
| 2002/0046087 A1 | 4/2002 | Hey | |
| 2002/0046098 A1 | 4/2002 | Maggio | |
| 2003/0003929 A1 | 1/2003 | Himmel et al. | |
| 2003/0050837 A1 | 3/2003 | Kim | |
| 2003/0182558 A1 | 9/2003 | Lazzaro et al. | |
| 2004/0091093 A1 | 5/2004 | Bookstaff | |
| 2005/0086104 A1 | 4/2005 | McFadden | |
| 2005/0149385 A1 | 7/2005 | Trively | |
| 2006/0067494 A1 | 3/2006 | Slagle et al. | |
| 2006/0206381 A1 | 9/2006 | Frayman | |
| 2007/0026852 A1 | 2/2007 | Logan et al. | |
| 2007/0055565 A1 | 3/2007 | Baur et al. | |
| 2007/0061198 A1 | 3/2007 | Ramer et al. | |
| 2007/0186252 A1 | 8/2007 | Maggio | |
| 2007/0226805 A1 | 9/2007 | Jeal et al. | |
| 2008/0133329 A1* | 6/2008 | Ullah | 705/10 |
| 2009/0216569 A1 | 8/2009 | Bonev et al. | |
| 2009/0265214 A1 | 10/2009 | Jobs et al. | |

OTHER PUBLICATIONS

Randall Stross, Apple Wouldn't Risk Its Cool Over a Gimmick, Would It?, *The New York Times*, Digital Domain, http:/www.nytimes.com/2009/11/15/business/15digi.html, Nov. 15, 2009, pp. 1-3.

Chetham, "Endure an Ad, Make a Free Call", Wireless Week, vol. 5, No. 46, Nov. 15, 1999, p. 28.

* cited by examiner

SYSTEM AND METHOD FOR INDIVIDUAL SEQUENTIAL CAMPAIGN

RELATED APPLICATIONS

The present application claims priority to U.S. Provisional Patent Application Ser. No. 61/239,589, filed Sep. 3, 2009, the disclosure of which is incorporated by reference in its entirety.

The present application is related to U.S. Pat. No. 7,440,563 entitled "Telecommunication and Advertising Business Model and Method of Utilizing the Same," and filed on Mar. 2, 2007, the disclosure of which is hereby incorporated by reference in its entirety.

FIELD OF THE INVENTION

The present invention is generally directed to business models that permit users to receive various services in return for receiving commercial messages. Specifically, the commercial messages received by a user may require a certain level of cognitive awareness, and also may be individualized and sequential, thereby providing a more directed and applicable commercial message.

BACKGROUND OF THE INVENTION

Various services are provided to users free of charge in exchange for the user being exposed to advertisements. The business model of GOOGLE™ is one of the most successful examples. GOOGLE™ provides search services while advertisements related to user-provided search terms are displayed in addition to the user's search results.

Similarly, HULU™ provides video services to users free of charge. Prior to, and during the course of a video presentation, HULU™ interrupts the video and displays an advertisement or commercial message to the user.

However, neither GOOGLE™ nor HULU™, nor any other prior art system of which the applicant is aware, requires a user to maintain a certain quantum of cognitive awareness regarding the commercial message. U.S. Pat. No. 7,440,563, owned by Sumo Technologies, LLC—the owner of this instant application, discloses some embodiments of such commercial messaging, termed "guaranteed cognitive awareness."

The use of guaranteed cognitive awareness programs in commercial messaging provides assurances to advertisers that their commercial message is actually understood by users, rather than ignored. However, the guaranteed cognitive awareness program described in U.S. Pat. No. 7,440,563 fails to provide a platform of learning about specific consumers and providing an individualized advertising campaign targeted at such specific consumer.

Accordingly, it is desirable to utilize a guaranteed cognitive awareness program to implement a sequential, individualized advertising or marketing campaign, wherein advertisements either build on one another, or where demographic data is received from the user in response to the guaranteed cognitive awareness questions and such data is utilized to tailor a specific advertising campaign at a specific user.

SUMMARY OF THE INVENTION

Aspects of the invention include the use of a guaranteed cognitive awareness coupled with an individualized sequential advertising campaign directed at a specific user. In other words, in accordance with some embodiments of the invention, a user may be offered services such as, but not limited to: telecommunication services, video services, radio or other audio services (traditional radio or satellite radio services), television services (traditional cable or satellite television services), software services, electronic book services, etc. In return for the use of such services free of charge, the services may be periodically interrupted and a commercial message may be conveyed to the user. The commercial message may prompt the user to input a specific value, selection, or keystroke, or may require a response through voice input or selection with a device (e.g., a mouse, pointer, remote, etc.). Should the user provide the response, the provision of services may continue. Moreover, the commercial messages provided to the user may presented as an individual sequential advertising campaign.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF THE DRAWINGS

In order to assist in the understanding of the invention, reference will now be made to the appended drawings, in which like reference characters refer to like elements. The drawings are exemplary only, and should not be construed as limiting the invention.

DETAILED DESCRIPTION OF THE PREFERRED EMBODIMENTS

Figure 1:
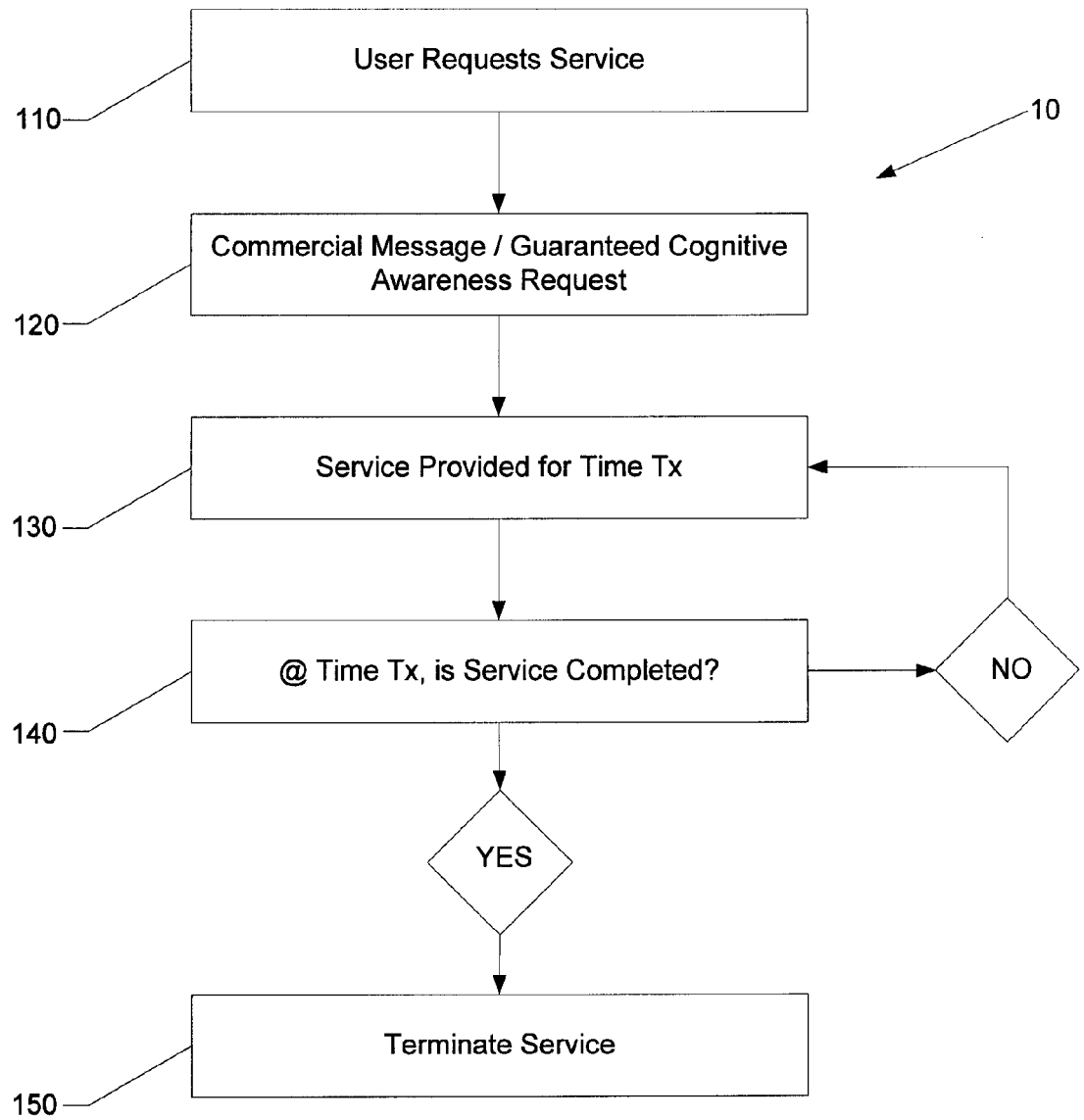
FIG. 1 illustrates a general method of providing services to a user in return for the user being presented with commercial messages, in accordance with some embodiments of the present invention.

FIG. 1 depicts a general method 10 of providing services to a user in return for the user being presented with commercial messages in accordance with some embodiments of the present invention. At step 110, a user requests a service, which, as noted above may be any type of service. At step 120, the user is presented with a commercial message, which may include a guaranteed cognitive awareness element. At step 130, the service is provided for a period of time, such as time=$T_x$. After $T_x$, and at step 140, it is determined if the service is complete. If the service is not complete, the user is presented with another commercial message at step 120. If the service is complete, the service is terminated at step 150.

Figure 2:
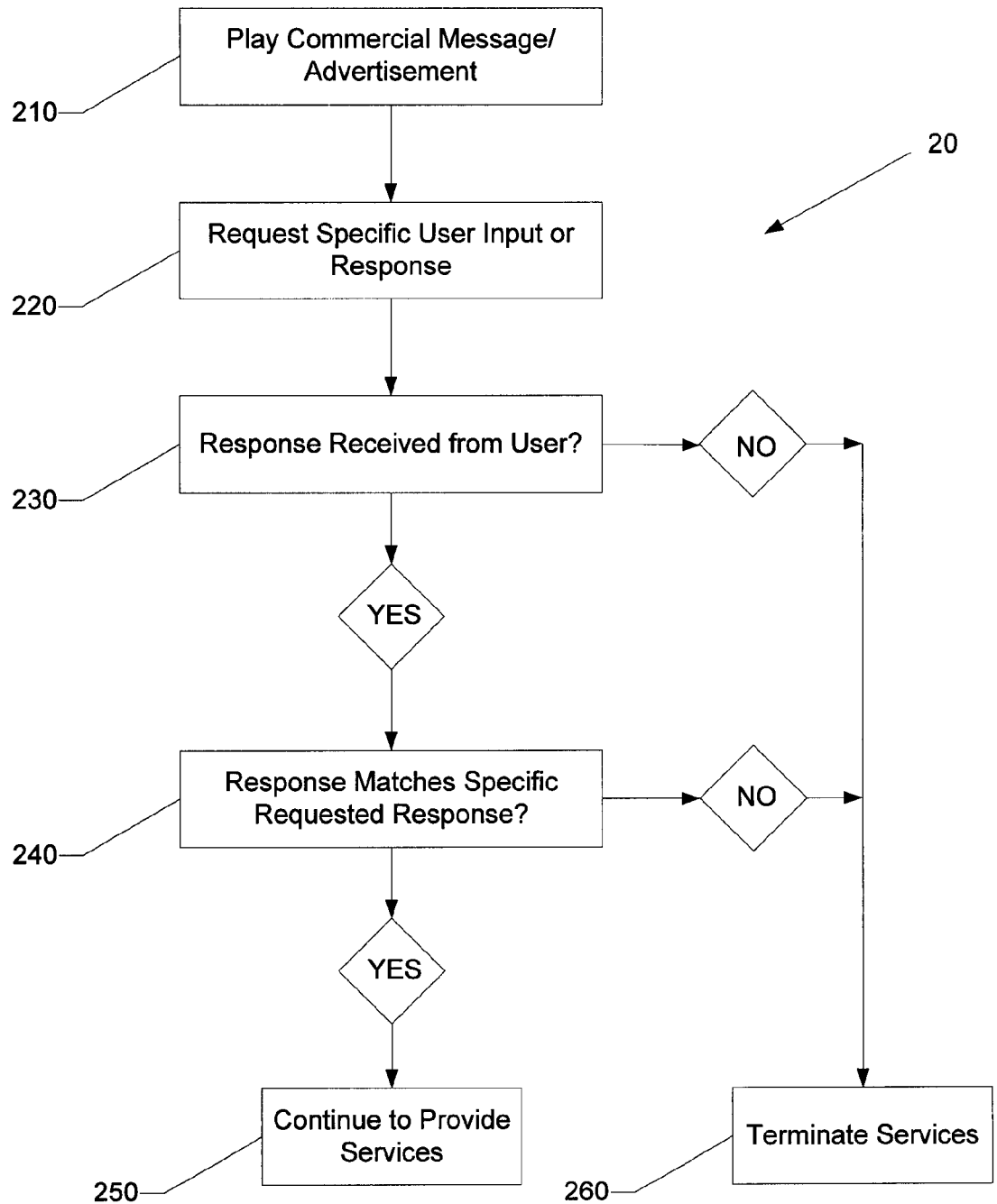
FIG. 2 illustrates a general method of guaranteed cognitive awareness, in accordance with some embodiments of the present invention.

FIG. 2 depicts a generalized method 20 of guaranteed cognitive awareness, in accordance with some embodiments of the present invention. With reference to FIG. 1, the method depicted in FIG. 2 may be present in step 120.

With renewed reference to FIG. 2, a user is played a commercial message or advertisement at step 210. At step 220, the user is requested to provide an input, thereby acknowledging reception and some level of understanding of the commercial message. At step 230, the response is received from the user.

If a response is not received, the service may be terminated at step 260. If a response is received, it is determined if the response matches the expected or requested input at step 240. If the response does not match the expected or requested input, the service is terminated at step 260. If the response does match the expected or requested input, the service is continued at step 250. Note that FIG. 2 is exemplary only, and variations may occur without deviating from the invention. For example, the initial commercial message played to the user at step 210 may be omitted. Similarly, the user may receive multiple chances to provide a matching expected or requested input.

In order to provide a more targeted—and user relevant—commercial message, data may be obtained about the user. This data may be obtained from external sources, or may be obtained from various requests for a specific user input. For example, data may be obtained about the user's geographic area. This information may be determined from a user's telephone number (if the services provided are telecommunication services), ISP address (if the services provided involve, or are provided over, the internet), or account information (if the services provided involve a particular location, such as home digital or cable television). This information may be used to contour the specific individualized advertisement campaign that the user is exposed to.

The provision of services may also be part of a subscription business model, in which upon joining a user may be required to supply certain demographic data. Alternatively, or in combination with the above-discussed approaches, user data may be obtained through various requests for a specific user input. For example, service may be interrupted and a user may receive a commercial message advising "Press 7 if you own a home; Press 4 if you rent." Upon pressing 7 information will be stored identifying the specific user as a home owner. Similarly, upon pressing 4 information will be stored identifying the specific user a renter.

Figure 3:
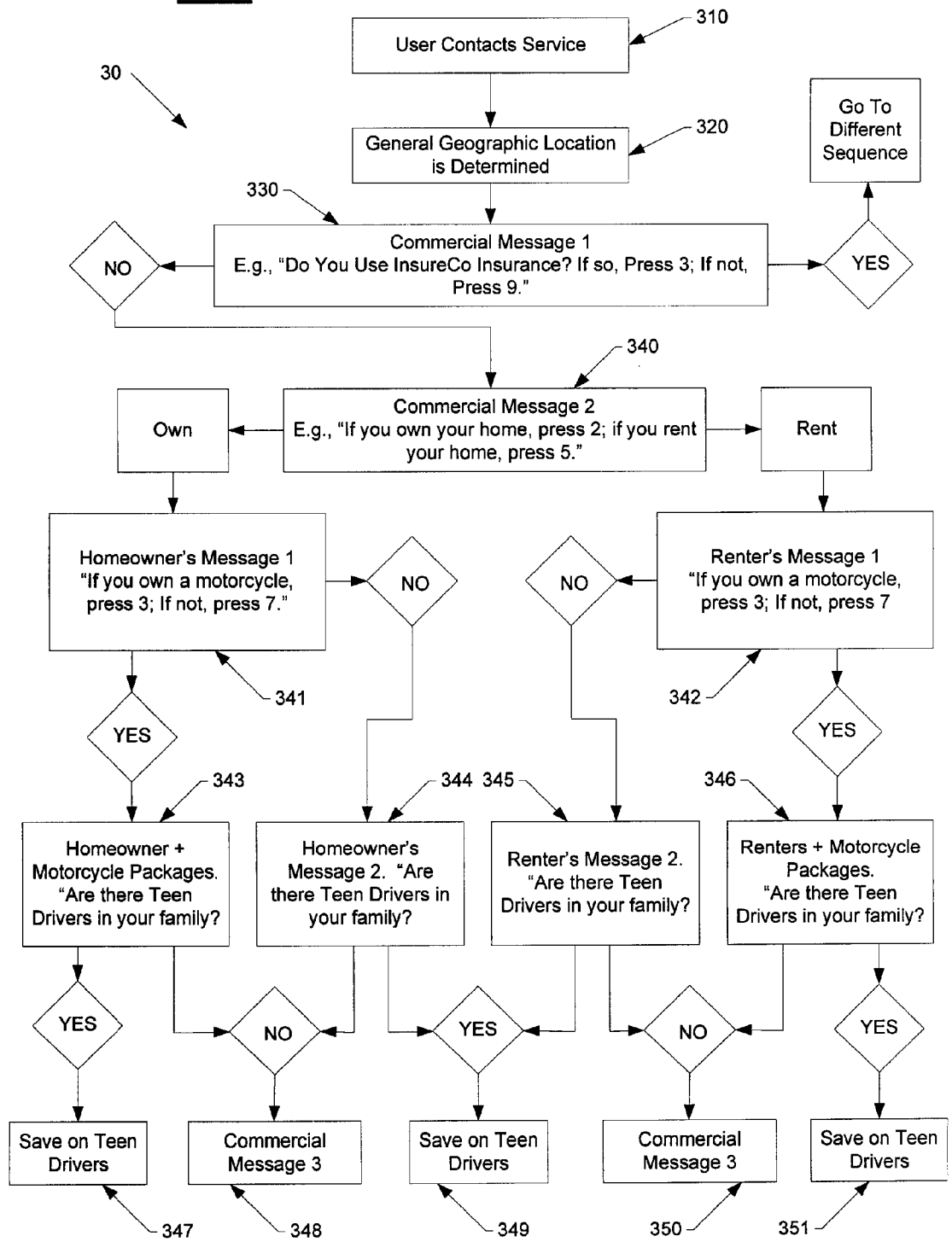
FIG. 3 illustrates an exemplary method of an individual sequential advertising campaign, in accordance with some embodiments of the present invention.

This information may be used in a manner depicted in FIG. 3, which illustrates a method of an individual sequential advertising campaign in accordance with some embodiments of the present invention. At step 310, a user may contact a service, in order to obtain the service free of charge. The service may be any type of service, examples of which are discussed above. At step 320, the service provider may determine the general location of the user, via methods such as automatic number identification (ANI) or ISP determination. Upon determining the geographic area of the user, the library of applicable commercial messages or advertisements is adjusted accordingly. For example, if a user's location is determined to be in the north east, advertisements for south western companies may be excluded.

The provision of services may be periodically interrupted in order to provide the user with commercial messages. The commercial messages may include a guaranteed cognitive awareness component. These aspects are discussed in greater detail above, with reference to FIGS. 1 and 2. FIG. 3 illustrates the flow of commercial and advertising messages during the provision of services. With continued reference to FIG. 3, at step 330 a general commercial message may be played to a user, such as an insurance company ("InsureCo") general message 1. Moreover, during the message the guaranteed cognitive awareness element may be utilized to illicit additional information from the user. For example, the user may be asked, at step 330 "Do you currently use InsureCo insurance? If so, press 3; if not, press 9." If the user is already a InsureCo customer, the user may be presented with a different commercial advertisement at step 335. Alternatively, the user may be presented with a different sequence of advertisements directed at expanding coverage of existing InsureCo customers. If the user does not use InsureCo, the process may continue to step 340.

At step 340, a InsureCo Insurance general message 2 may be played. This message may build on the message played at step 330, such as continuing a specific theme of InsureCo. During or following the message, the user may be presented with the guaranteed cognitive awareness element of "If you own your home, press 2; If you rent your home, press 5".

The next commercial message will then be again contoured to the user's specifics. If the user owns their home (and correctly presses 2), the next commercial message, played at step 341 may be an advertisement advising the user of InsureCo's homeowner's insurance. If the user rents their home (and correctly presses 5), the next commercial message, played at step 342 may advise the user of InsureCo's renter's insurance. Each message played at step 341 or 342 may include a guaranteed cognitive awareness element, for example asking a user if he or she owns a motorcycle. If, a user identified as a homeowner in step 340 answers that he or she owns a motorcycle, the next sequential advertisement may advise the user at step 343 of package deals combining homeowner insurance with motorcycle insurance. Similarly, if the user is identified as a renter that owns a motorcycle, the next sequential advertisement may advise the user at step 346 of package deals combining renter's insurance with motorcycle insurance.

If the user is identified as a homeowner but does not own a motorcycle, the user may be presented with a second InsureCo homeowner's insurance message at step 344. Similarly, if the user is identified as a renter but does not own a motorcycle, the user may be presented with a second InsureCo renter's insurance message at step 345. During commercial messages presented at steps 343, 344, 345, or 346, a guaranteed cognitive awareness element may be included querying the user if they have teen drivers in the family. If so, the user's may be presented with current InsureCo deals on teen drivers at steps 347, 349, or 351. If the user does not have any teen driver's in the family, the user may be presented with InsureCo Insurance general message 3, for example, continuing a particular theme, at steps 348 or 350.

The process depicted in FIG. 3 is exemplary only, and it is quickly evident the widespread uses this process may have. Information can gradually be accumulated about a specific user, either during a single provision of services—or, in the case of a subscription service—throughout multiple provisions of services.

For example, in order to obtain services free of charge a user may be required to subscribe to the service. An initial enrollment may be required that may provide the service provider with information such as geographic location, age, sex, family size, etc. For subscribers, the combination of guaranteed cognitive awareness elements and individualized sequential advertising campaigns provides advertisers with a captive audience at whom particularly relevant and applicable advertisements may be directed. The significant value in having such a captive audience, as well as being able to provide relevant directed advertisements, thereby funds the provision of free or reduced rate services to the users.

A library of potential advertisements may be maintained by the service provider, and upon receiving additional information about a specific user, the relevant library may be gradually reduced and honed in on the specific user. This aspect may be useful when signing up advertisers. Advertisers may only pay a specified amount based upon the frequency their advertisement is played. Smaller, or niche advertisers may be more interested in signing up for such services, knowing that their niche product will be advertised to their niche market only, and the advertiser will not be paying for superfluous marketing. For example, an advertisement for an automotive restorative product may only be played to the ideal demographic of males, aged 16-35, who own a car that is more than 5 years old, who generally perform standard maintenance and repairs on their vehicles themselves.

Figure 4A:
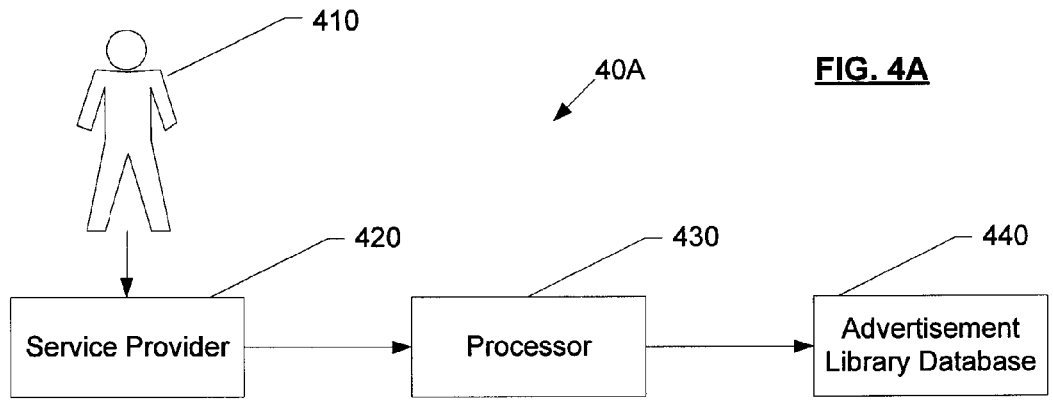
FIG. 4 illustrates an exemplary system in accordance with some embodiments of the present invention.
Figure 4B:
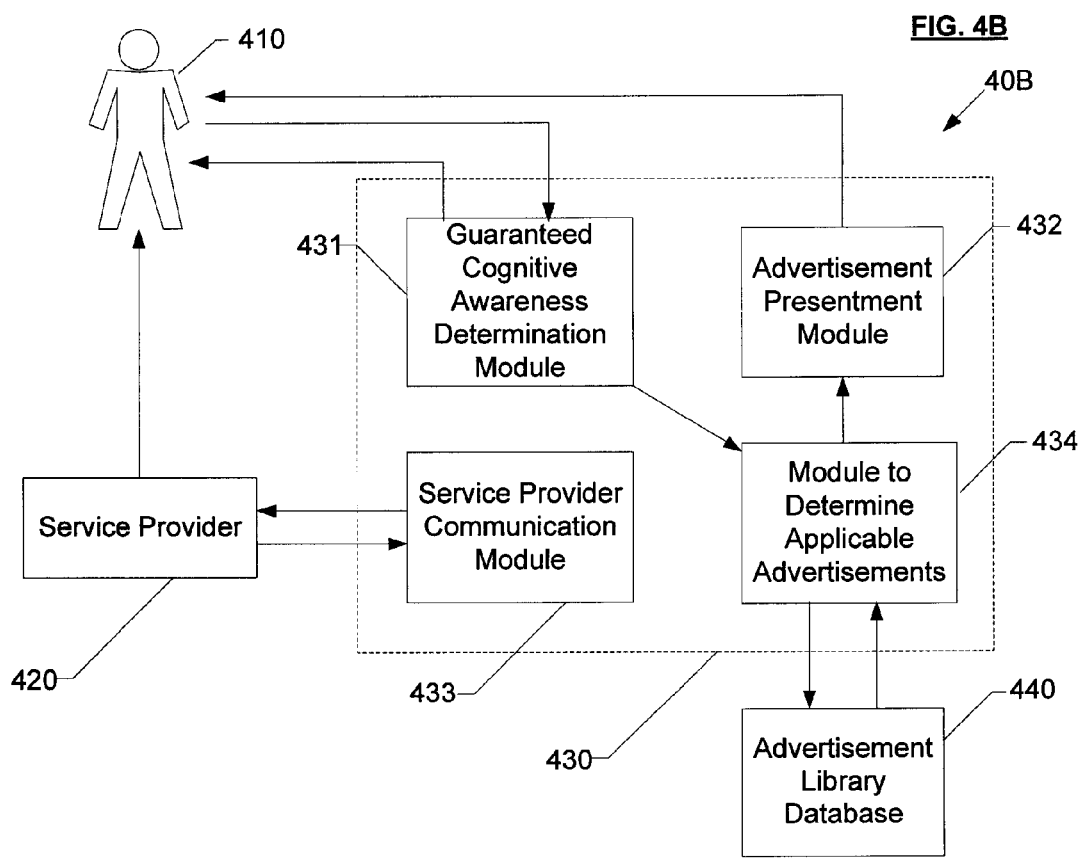

FIGS. 4A-4B illustrate exemplary systems in accordance with some embodiments of the present invention. FIG. 4A depicts an overall system 40A, comprising a user 410, a service provider 420, a processor 430, and an advertisement library database 440. In the exemplary embodiment illustrated in FIG. 4A, the processor 430 draws advertisements from the advertisement library database 440 and provides such advertisements to the service provider 420, which in turn provides the advertisements to the user 410. In this exemplary embodiment, the service provider interacts with the user 410 in order to interrupt service to convey the advertisements, as well as receive the user's 410 responses to the guaranteed cognitive awareness queries and pass such responses on to the processor 430. The processor 430 compares the response received from the user 410 with set criteria to determine if the user 410 has adequately or properly responded to the guaranteed cognitive awareness query.

FIG. 4B illustrates another exemplary system in accordance with some embodiments of the present invention. FIG. 4B depicts an overall system 40B, which, as in 4A, comprises a user 410, a service provider 420, a processor 430, and an advertisement library database 440. The processor 430 in turn comprises a guaranteed cognitive awareness determination module 431, an advertisement presentment module 432, a service provider communication module 433, and a module to determine applicable advertisements 434.

With continued reference to FIG. 4B, in use the module to determine applicable advertisements 434 determines a first set of applicable advertisements and conveys one or more of these advertisements to the advertisement presentment module 432. At this point, the service provider communication module 433 may communicate with the service provider 420 so that service is temporarily interrupted, and the advertisement presentment module 432 provides the one or more advertisements to the user 410. The one or more advertisements may include a guaranteed cognitive awareness query or element, and the user 410 may respond to such query to the guaranteed cognitive awareness determination module 431. The guaranteed cognitive awareness module 431 may determine if the user 410 provided an appropriate or proper response. If the user 410 provided an appropriate or proper response, the guaranteed cognitive awareness determination module 431 may inform the service provider communication module 433 that service may be continued, and such message may be conveyed to service provider 420. Moreover, the guaranteed cognitive awareness determination module 431 may pass the specific response to the module to determine applicable advertisements 434 which, based upon the specific response to the guaranteed cognitive awareness element or query, may reduce the number of applicable advertisements to a subset. This cycle then repeats itself, with the user 410 being presented with an advertisement from the advertisement presentment module 432 drawn from the new subset of applicable advertisements from the module to determine applicable advertisements 434.

While the above disclosure has discussed conducting a dynamic individual sequential advertising campaign during the provision of services, such a sequential campaign may be provided with regard to products, as well. For example, it is contemplated that a user may listen to a series of sequential advertisements, and following completion of a series the user may be entitled to a free, or reduced-price, product. Another example may be an audio or computing device. A user may receive an mp3 player for a reduced fee, but during use the mp3 player may present the user with an individual sequential advertising campaign. Similarly, a user may receive a free or reduced-price computer, and the operation of the computer may be periodically interrupted (or the computer may not fully start-up) and may present the user with an individual sequential advertising campaign. In other words, while the systems and methods above are discussed with regard to services, it is contemplated that these systems and methods are equally applicable to products.

It will be apparent to those skilled in the art that various modifications and variations can be made in the method, manufacture, configuration, and/or use of the present invention without departing from the scope or spirit of the invention. For example, the input of users may be received via key-stroke, pointer selection, voice-input, manual selection, or any other type of indication. It is likewise to be understood that the systems and methods of the invention may applied to multiple commercial advertisements. For example, in the example discussed with reference to FIG. 3 above, if a user is identified as a motorcycle owner an advertisement may provided that is not part of the InsureCo sequence, but rather an advertisement from Harley Davidson or some other related advertiser.

What is claimed is:

1. A method for an individualized sequential advertising campaign comprising:
   providing, by a computer processor, a service to a user;
   presenting, by the computer processor, a commercial message to the user before or during the service;
   during the commercial message, prompting the user to provide an input in response to a query presented to the user during or following the commercial message, wherein the input is selected from at least two options presented in the query;
   receiving, by the computer processor, the input from the user;
   continuing to provide the service following receiving the input;
   determining, by the computer processor, a subsequent commercial message to present to the user based upon the input from the user;
   presenting, by the computer processor, the subsequent commercial message to the user during the service;
   during the subsequent commercial message, prompting the user to provide a second input in response to a second query presented to the user during or following the subsequent commercial message, wherein the second input is selected from at least two options presented in the second query;
   continuing to provide the service following receiving the second input; and
   terminating, by the computer processor, the service upon failing to receive either the input or the second input.

2. The method of claim 1, wherein the subsequent commercial message is determined based also on previously gathered information on the user.

3. The method of claim 1, wherein the service is a subscription-based service with multiple provisions of the service, and the method further comprises accumulating information about the user during the multiple provisions of the service.

4. The method of claim 3, further comprising:
   maintaining a library of commercial messages; and as information is received from the user in response to each query, excluding some of the commercial messages in the library for presentation to the user.

5. The method of claim 1, wherein
the service is a subscription-based service involving multiple provisions of the service;
multiple inputs are received from the user in response to multiple queries; and
each commercial message presented to the user is customized to the user based on the multiple inputs.

6. The method of claim 1, wherein the service is a subscription-based service and the method further comprises receiving information from the user when the user subscribes to the service.

7. The method of claim 6, wherein the commercial message presented to the user is based on the information received from the user when the user subscribes to the service.

8. The method of claim 1, wherein the service comprises at least one of: a telecommunication service, video service, radio service, television service, software service, or electronic book service.

9. The method of claim 1, wherein the service is provided to the user free of charge.

10. The method of claim 1, further comprising determining, by the computer processor, a general location of the user prior to providing the commercial message.

11. The method of claim 10, wherein the commercial message is customized based upon the general location of the user.

12. The method of claim 1, wherein the input demonstrates that the user acknowledges reception of and a level of understanding of the commercial message.

13. A system for an individualized sequential advertising campaign directed at a user, comprising:
a database that stores a plurality of commercial messages; and
one or more servers that:
provide a service to a user;
present a commercial message to the user before or during the service;
prompt the user, during presentation of the commercial message, to provide an input in response to a query presented to the user during or following the commercial message, wherein the input is selected from at least two options presented in the query;
receive the input from the user;
continue the service following completion of the commercial message;
determine a subsequent commercial message to present to the user based upon the input from the user;
present the subsequent commercial message to the user during the service;
during the subsequent commercial message, prompt the user to provide a second input in response to a second query presented to the user during or following the subsequent commercial message, wherein the second input is selected from at least two options presented in the second query;
continue to provide the service following receiving the second input; and
terminating the service upon failing to receive either the input or the second input.

14. A computer-implemented method comprising:
requesting a free service from a server using a user communication device;
receiving the service from the server using the user communication device;
receiving a commercial message from the server before or during the service through the user communication device;
during the commercial message, receiving a prompt from the server to provide an input in response to a query, wherein the input is selected from at least two options presented in the query;
in response to the query, sending input to the server using the user communication device;
continuing to receive the service after completion of the commercial message;
receiving a subsequent commercial message through the user communication device that is based on the input sent to the server;
during the subsequent commercial message, receiving a second prompt from the server to provide a second input in response to a second query, wherein the second input is selected from at least two options presented in the second query;
in response to the second query, sending the second input to the server using the user communication device;
continuing to receive the service after completion of the subsequent commercial message;
terminating the service upon failing to receive either the input or the second input.

* * * * *